United States Patent

Cholet

[11] 4,035,619
[45] July 12, 1977

[54] ANALOG COMPUTER, PARTICULARLY FOR AN IGNITION SYSTEM FOR INTERNAL COMBUSTION ENGINE

[75] Inventor: Jean M. Cholet, Villeneuve-Loubet, France

[73] Assignee: Texas Instruments Incorporated, Dallas, Tex.

[21] Appl. No.: 585,167

[22] Filed: June 9, 1975

[30] Foreign Application Priority Data

June 11, 1974 France .......................... 74.20177

[51] Int. Cl.² .................... G06F 15/50; F02P 5/04
[52] U.S. Cl. .................. 235/150.2; 123/148 E; 235/197; 324/16 R
[58] Field of Search ........ 235/150.21, 197, 150.53, 235/150.2; 73/119 A; 123/143, 179, 184, 148; 324/15, 16 R

[56] References Cited

U.S. PATENT DOCUMENTS

| | | | |
|---|---|---|---|
| 3,689,755 | 9/1972 | Hodgson et al. | 235/197 |
| 3,785,356 | 1/1974 | Niemoeller | 123/148 |
| 3,904,856 | 9/1975 | Monpetit | 235/150.21 |
| 3,906,207 | 9/1975 | Rivere et al. | 235/150.21 |

FOREIGN PATENT DOCUMENTS

| | | |
|---|---|---|
| 1,439,974 | 6/1976 | United Kingdom |
| 1,413,685 | 11/1975 | United Kingdom |
| 1,448,373 | 9/1976 | United Kingdom |

*Primary Examiner*—Malcolm A. Morrison
*Assistant Examiner*—Errol A. Krass
*Attorney, Agent, or Firm*—Harold Levine; Richard L. Donaldson; James T. Comfort

[57] ABSTRACT

An analog computer for controlling the ignition system of an internal combustion engine. A continuous signal is synthesized corresponding to the ignition advance angle as a function of the engine speed of rotation and of air intake pressure. This signal is synthesized in accordance with a characteristic for the particular engine concerned. The ignition advance signal is used to control commencement of a power supply pulse to the ignition system, with respect to a reference time signal, as a function of the instantaneous speed of rotation of the engine. Preferably the duration of the power supply pulse is maintained constant regardless of engine rotation speed and ignition advance angle. The circuits described for fulfilling these functions are designed for realization as bipolar integrated circuits.

17 Claims, 6 Drawing Figures

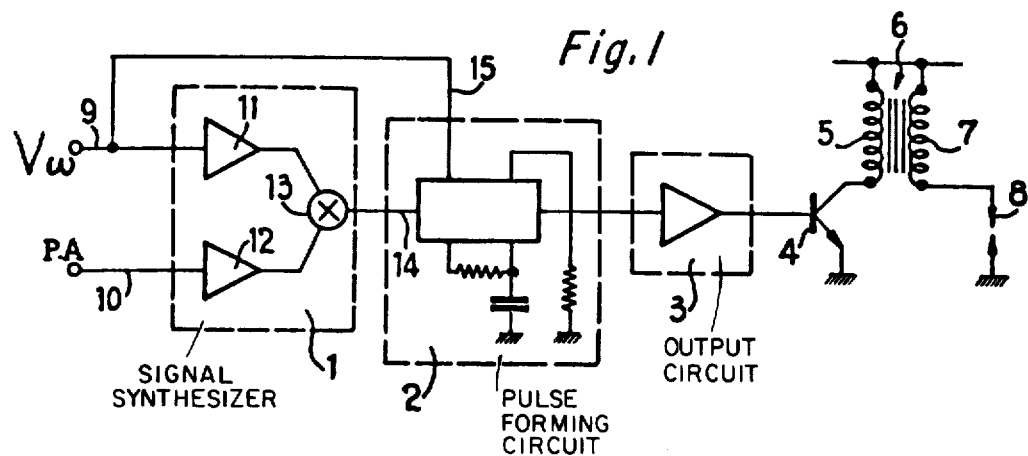
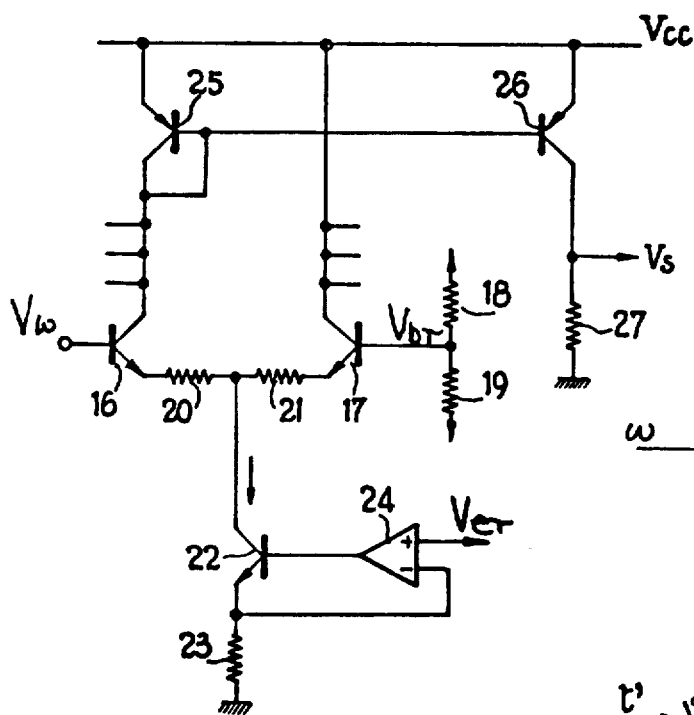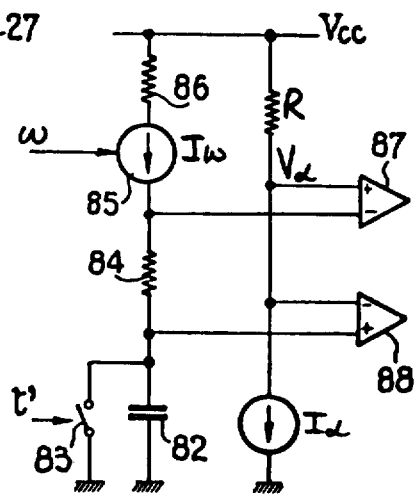

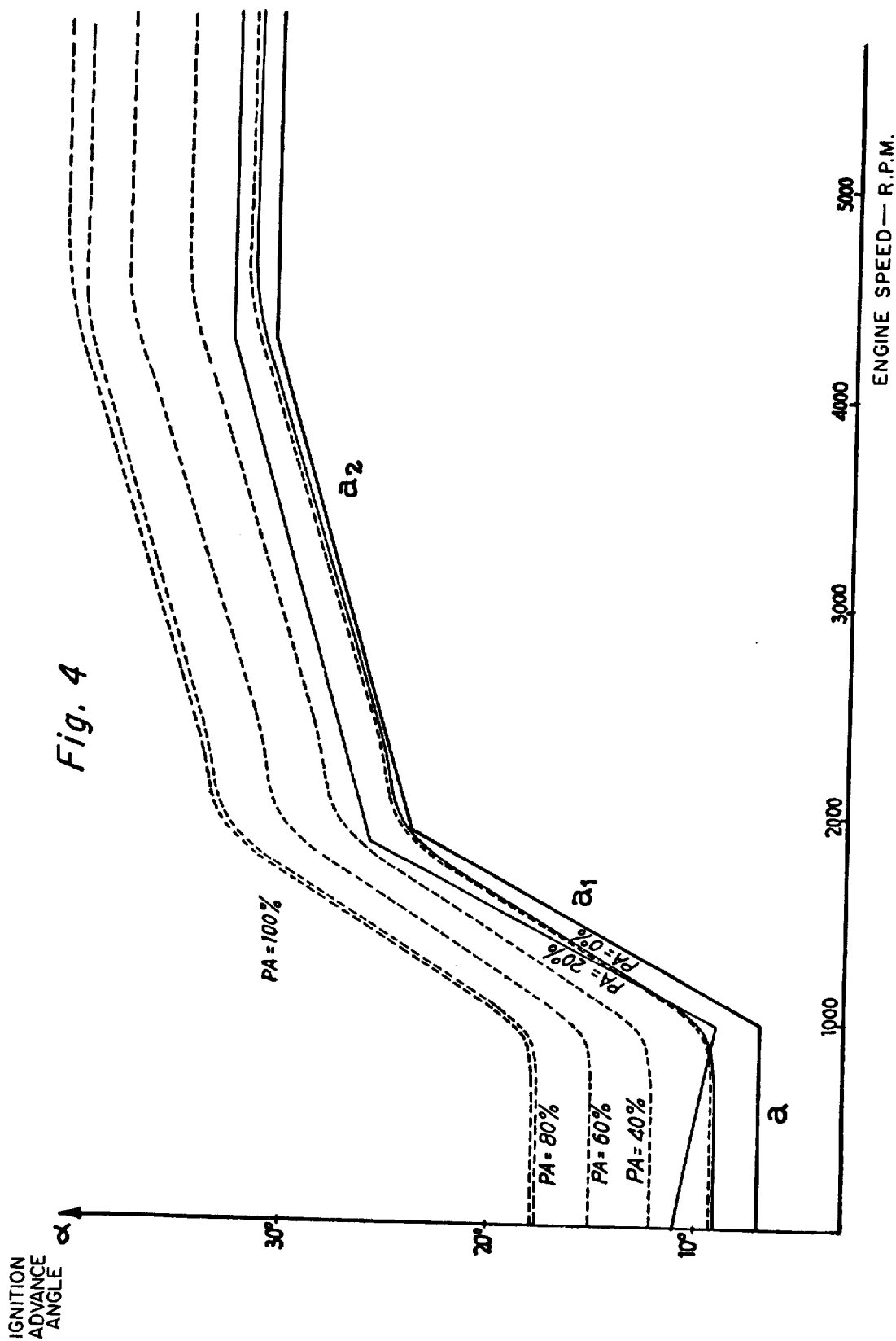

ANALOG COMPUTER, PARTICULARLY FOR AN IGNITION SYSTEM FOR INTERNAL COMBUSTION ENGINE

The present invention relates to an analog computer intended in particular for use in an ignition system of an internal combustion engine.

The advance of the ingition of an internal combustion engine must vary, during operation of the engine, with the engine speed and with the intake manifold pressure, and the interval of time, during which the induction coil of the ignition circuit is energized, should preferably be constant to ensure that the coil can supply the spark plugs of the motor with sufficient energy to cause the formation of the required ignition spark.

The present invention provides an analog computer, in particular for the ignition system of an internal combustion engine, which comprises a synthesizer of a continuous signal corresponding to the ignition advance angle $\alpha$ as a function of the engine speed of rotation and of the air intake pressure, in accordance with a predetermined response characteristic, and a circuit which control the instant at which the ignition coil is fed with current, relative to a reference time, as a function of the instantaneous speed of rotation of the engine and the value of the output signal from the said signal synthesizer. An analog computer of relatively simple construction and small size may be constructed in accordance with the invention, which will ensure, for the ignition system with which it is associated, an operation that is closely matched with theoretical characteristics of an engine as provided by the manufacturer.

According to one particular feature of the invention, the said synthesizer, which continuously generates ignition advance angle signals, comprises a series of stages designed to synthesize signals describing discrete segments of a predetermined response curve, each segment representing variations of the advance angle as a function of the speed of rotation of the engine, within predetermined intervals of the speed range; a stage designed to synthesize a signal describing a curve representing the variation in the advance angle as a function of the intake manifold (air intake) pressure, and means for summation of the signals representing the variations in the ignition angle as a function of the speed of rotation of the engine and as a function of the intake manifold pressure.

For a more detailed explanation of the invention summarized above, and how it may be put into effect, together with description of further advantages thereof, reference will be made to exemplary embodiments of the invention as illustrated by the drawings, wherein:

FIG. 1 is a schematic diagram of an analog computer embodying the invention;

FIG. 2 is an electrical circuit diagram representing a stage of the response curve synthesizer for the computer in FIG. 1;

FIG. 4 is a graph showing the ignition advance angle as a function of the speed of engine rotation, for several values of the engine intake pressure, obtained by means of the synthesizer in FIG. 3;

FIG. 5 is an electrical diagram of a pulse shaping circuit for the computer in FIG. 1.

Figure 3:
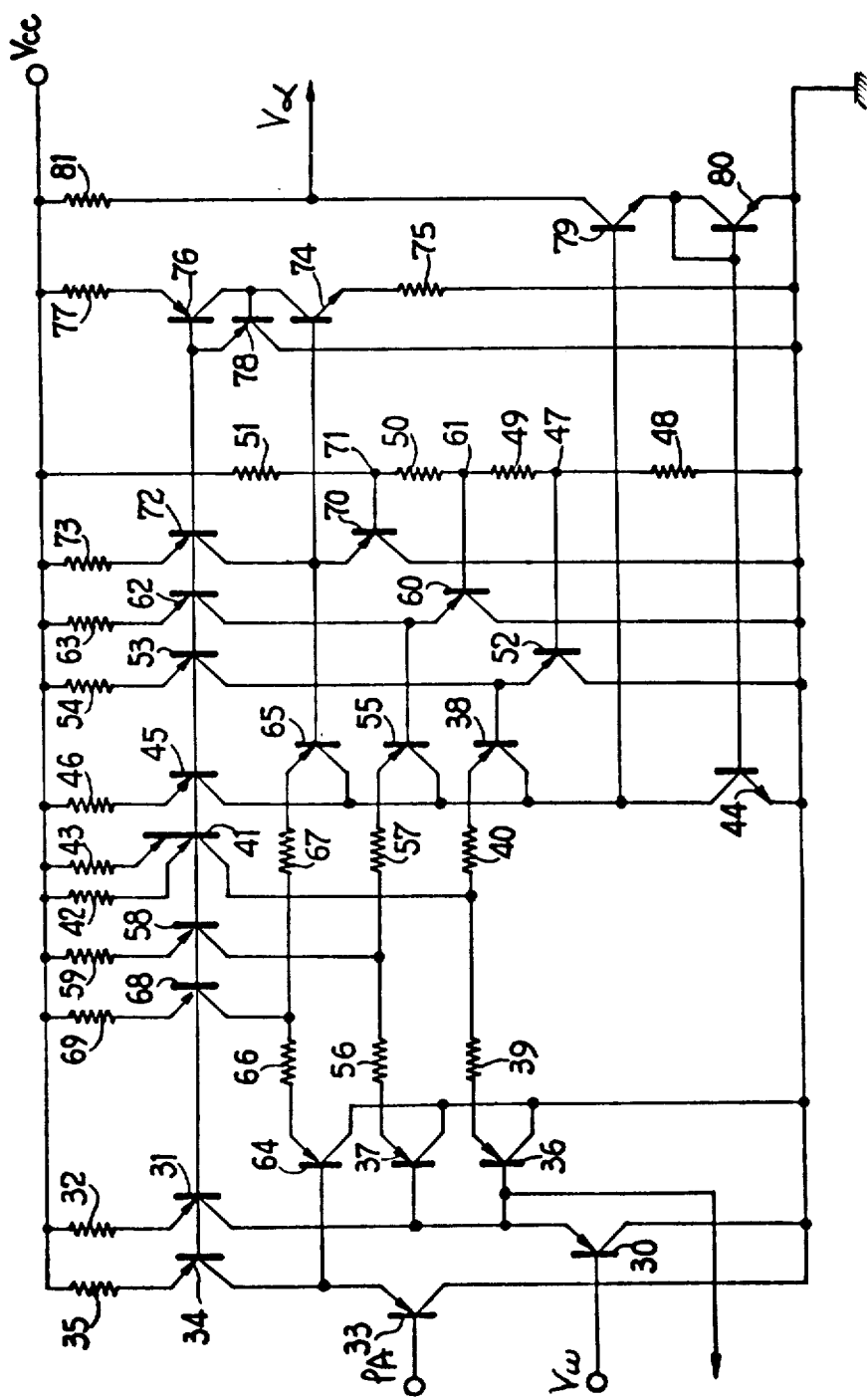
FIG. 3 is an electrical circuit of the complete response curve synthesizer for an analog computer according to the invention.

Referring to FIG. 1, the invention is assumed, by way of example, to be applied to an ignition system for an internal combustion engine.

The analog computer represented in FIG. 1 comprises, essentially, a signal synthesizer 1 for generating an ignition advance signal as a continuous function of engine speed and of the fuel mixture pressure in the intake manifold of the engine.

The output from the signal synthesizer 1 is connected to the input of a pulse forming circuit 2, the output of which is connected to an output circuit 3, controlling an npn power transistor 4. The collector-emitter path of transistor 4 is connected between circuit ground and the primary winding 5 of an ignition induction coil 6, which is to be fed intermittently by the computer according to the invention.

The secondary winding 7 of the coil 6 is connected to the terminals of spark plugs such as 8, of the engine through a distributor (not shown) in conventional manner.

The ignition advance signal generator 1 has two inputs 9 and 10 for receiving, during operation of the engine, an electric signal $V\omega$ proportional to the speed of rotation ($\omega$) of the output shaft of the engine (input 9), and an electric signal (PA) proportional to the intake manifold pressure. These signals may be derived in known manner.

The signals fed to inputs 9 and 10 are amplified by amplifiers 11 and 12, the outputs of which are fed to an adder 13. The output from the adder 13 is connected to a first input 14 of a pulse shaping circuit 2, which has a second input 15 to which is applied the electric signal ($V\omega$) proportional to the engine speed. The shaping circuit 2 will be described in more detail in reference to FIG. 5.

The amplifier 12 of the generator 1 includes several stages each constituted in the manner represented in FIG. 2, each stage being designed to synthesize a discrete signal approaching as closely as possible to a corresponding segment of the curve (a) shown in FIG. 4. FIG. 4 depicts the required relationship between the ignition advance angle and engine rotation speed (r.p.m.) in accordance with reference or "model" data supplied by the manufacturer of an engine to be equipped with computer according to the invention.

The amplifier stage in FIG. 2 is a transconductancetype differential amplifier including two npn transistors 16 and 17. The base of transistor 16 receives an electric signal ($V\omega$) proportional to the engine speed of rotation, while the base of transistor 17 is connected to the junction point of two resistors 18, 19, forming part of a resistor chain (potentiometer) connected between a DC source and ground, and establishing an intermediate reference voltage (Vbr) corresponding to the curve segment to be synthesized by the amplifier stage in question.

The emitter of transistor 16 is connected to that of transistor 17, through two series resistors 20, 21. The junction point of resistors 20 and 21 is connected to the collector of a transistor 22, the emitter of which is connected to ground through a resistor 23, and whose base is connected to the output of a differential amplifier 24. The inverting input of this amplifier is connected to the emitter of transistor 22, while a DC level Ver is applied to its non-inverting input.

The collector of transistor 16 is connected to the collector of a transistor 25, whose emitter is connected to a $\overline{DC}$ supply line Vcc and whose base is connected to the base of a transistor 26. The base and collector of transistor 25 are connected together. The emitter of transistor 26 is connected to the DC supply line Vcc, while its collector is connected to ground through a resistor 27, across which the output voltage Vs of the stage is taken. Transistors 25, 26 provide a current mirror summing function. The collector of transistor 17 is connected directly to the DC supply line Vcc.

The amplifier stage just described functions as follows. The middle point of the segment of the curve which is to be synthesized by the stage, is established by the voltage Vbr at the junction point of resistors 18 and 19. This voltage is also that of the base of transistor 17. The base of transistor 16 receives an input voltage $V\omega$, for example a voltage proportional to the engine speed of rotation. The slope of the segment of curve to be synthesized is given by the ratio $$\frac{\Delta V_\omega}{Re}$$

between the variation in input voltage $V\omega$ and the sum (Re) of the two emitter resistors 20 and 21 which interconnect the emitters of transistors 16 and 17.

The extreme points of the curve segment to be defined are established by the currents $I_{max}$ and $I_{min}$ of the emitters of transistors 16 and 17, these currents being defined by the ratio $$\frac{Ver}{R_{23}}$$

between the voltage applied to the amplifier 24 and the resistance 23.

When the input voltage $V\omega$ applied to the base of transistor 16 is sufficient to make it conductive, its collector voltage drops and this drop is applied to the base of transistor 26, causing the appearance, across the resistor 27, of an output voltage Vs whose value is defined in accordance with the segment of curve defined by the characteristics of the circuit set forth above.

The circuit shown in FIG. 3 is the complete circuit of the ignition angle response curve synthesizer. This circuit, designed to synthesize the response curve represented by FIG. 4, comprises three stages analogous to the one represented in FIG. 2. Referring to FIG. 4, it is seen that the response curve supplied by the manufacturer has two inclined segments $a_1$ and $a_2$. The circuit in FIG. 3 therefore has two stages designed to process, respectively, sections $a_1$ and $a_2$ as a function of the engine speed of rotation, and one stage designed to modify the response curve as a function of the intake manifold pressure.

On comparing the stage represented in FIG. 2 with those in FIG. 3, it is to be noted that the transistors used for the differential amplifiers of the circuit in FIG. 3 are pnp transistors, while transistors 16 and 17 in the stage in FIG. 2 are npn type. This results in a reversal of the polarities of the voltages applied to certain components of the circuit, but the circuit configuration is derived directly from that of the stage in FIG. 2. The circuit in FIG. 3 includes a first input constituted by the base of a transistor 30, for receiving an electric signal ($V\omega$) corresponding to the engine speed of rotation $\omega$ generated, for example, by a tachometer generator (not shown).

The collector of transistor 30 is connected to ground, while its emitter is connected to a DC supply line Vcc through the collector-emitter path of a transistor 31 and a series emitter resistor 32. Transistor 30 constitutes the input stage for the part of the circuit in FIG. 3 designed to synthesize the electric signals in dependence on the engine speed of rotation.

The circuit also comprises a second input provided by the base of a transistor 33 for receiving an electric signal corresponding to the intake manifold pressure PA of the engine, generated, for example, by a pressure transducer (not shown). The collector of transistor 33 is connected to ground, while its emitter is connected to the DC supply line Vcc, through the collector-emitter path of a transistor 34 and a resistor 35 connected in series. Transistor 33 constitutes the input stage for the part of the circuit designed to synthesize the signal corresponding to the intake manifold pressure PA.

The emitter of transistor 30 is also connected to the bases of two transistors 36, 37 each of which forms a part of a stage for synthesizing a segment of the curve in FIG. 4 as a function of the engine speed. The stage containing transistor 36 also includes a transistor 38 whose emitter is connected to the emitter of transistor 36 through two resistors 39, 40 of the same value. The junction point of resistors 39 and 40 is connected to the collector of a dual-emitter transistor 41. The two emitters of transistor 41 are connected to the DC supply line Vcc by respective resistors 42, 43. The transistor 41 fulfills the function of transistor 22 and amplifier 24 in FIG. 2.

The collector of transistor 38 is connected on the one hand to ground through the collector-emitter path of an npn transistor 44, and on the other hand to the DC supply line Vcc through the collector-emitter path of a transistor 45 and a resistor 46 in series. The base of transistor 38 is connected via the emitter-base junction of grounded collector transistor 52 to a junction point 47 between two resistors 48 and 49, which form part of a chain of resistors 48 to 51 connected in series between ground and the DC supply line Vcc. The emitter of transistor 52 is also connected to the DC supply line Vcc through the collector-emitter path of a transistor 53 and a resistor 54 in series. The voltage at point 47 constitutes the reference voltage Vbr applied to transistor 38.

The stage including the transconductance-type differential amplifier, formed primarily by transistors 36 and 38, is designed to process the segment $a_1$ of the curve $a$ in FIG. 4, the middle of this segment being determined by the reference voltage at point 47.

The stage designed to synthesize segment $a_2$ of curve $a$, is identical in circuit configuration to the stage designed to sythesize segment $a_1$. It comprises, in addition to transistor 37, a transistor 55 whose emitter is connected to that of transistor 37 through two identical series resistors 56, 57. The value of resistors 56, 57 is different from that of resistors 39, 40 associated with transistors 36, 38, in such a way as to define, for the stage synthesizing curve segment $a_2$, a working threshold higher than that of the stage synthesizing segment $a_1$, the difference between the thresholds being compatible with the operating ranges of the two stages. The junction point of resistors 56 and 57 is connected to the DC supply line Vcc through the collector-emitter path of a transistor 58, and a resistor 59 in series. The collectors of transistors 37 and 55 are connected, respectively, to ground and to the collector of npn transistor 44. The base of transistor 55 is connected through the emitter junction of a grounded-collector transistor 60 to junction point 61 between resistors 49 and 50 in the chain of resistors 48–51, the voltage at point 61 being the reference voltage applied to the stage containing the differential amplifier formed by transistors 37 and 55. The emitter of transistor 60 is also connected to the DC supply line Vcc through the collector-emitter path of a transistor 62 and a resistance 63 in series.

The stage designed to synthesize the signal corresponding to the intake manifold pressure PA, applied to the transistor 33, comprises, like the preceding stages, two pnp transistors 64, 65, whose emitters are connected together through resistors 66, 67 of the same value. The junction point of these resistances is connected to the DC supply line Vcc through the collector-emitter path of a transistor 68 and a series resistor 69. The base of transistor 64 is connected to the emitter of transistor 33, while its collector is connected to ground. The collector of transistor 65 is connected to the collector of npn transistor 44, while its base is connected via emitter-base junction of grounded-collector transistor 70 to the junction point 71 of resistors 50 and 51 of the resistor chain 48–51. The emitter of transistor 70 is connected to the DC supply line Vcc through the collector-emitter path of a transistor 72 and a resistor 73 in series, as well as to the base of an npn transistor 74. The emitter of transistor 74 is connected to ground by a resistor 75 and its collector is connected to the collector of a transistor 76 whose emitter is connected to the DC supply line through a resistor 77.

The bases of transistors 31, 34, 41, 45, 53, 58, 62, 68, 72 and 76 are all connected together. The collectors of transistors 74 and 76 are connected to the base of a transistor 78 whose collector is connected to ground and whose emitter is connected to the base of transistor 76.

The collector currents of transistors 38, 55 and 65 are summed by a current mirror comprising npn transistors 44, 79 and 80 to produce, across a load resistor 81 connected to the collector of transistor 79, an output voltage Vα corresponding with the ignition advance angle (α) and having the required functional relation with engine rotation speed and intake manifold (air intake) pressure, as depicted in FIG. 4.

The pulse forming circuit 2 of the computer in FIG. 1 is shown in FIG. 5. It comprises, essentially, a capacitor 82, across which is connected a switch 83, operably coupled for response to rotation of the engine crankshaft in such a way that the switch closes to discharge the capacitor, whenever a piston on the crankshaft reaches a selected point of reference, for example the upper dead center of its stroke. The capacitor 82 is connected in series with a resistor 84 to one terminal of a current generator 85 which receives, at its input, a signal proportional to the engine rotation speed ω, generated by a tachometer generator (not shown). The other terminal of generator 85 is connected to a DC supply line Vcc through a resistor 86. The junction point of resistor 84 and generator 85 is connected to the inverting input of a comparator 87, whose non-inverting input is connected to the output Vα of the curve synthesizer shown in FIG. 3 and represented in FIG. 5 by the current generator Iα and series resistor R. The junction point of capacitor 82 and resistor 84 is connected to the non-inverting input of a comparator 88 whose inverting input is also connected to the output Vα of the curve synthesizer shown in FIG. 3.

The shaping circuit represented diagrammatically in FIG. 5 will be described in more detail with reference to FIG. 6 which includes two transistors 89, 90, forming part of generator 85 represented in FIG. 5. The base of npn transistor 89 is connected to receive a signal Vω proportional to the speed of rotation ω of the motor, while its collector-emitter path is connected across the base-collector path of pnp transistor 90. The base of transistor 90 is also connected to its emitter through a resistor 92, and its collector is connected to ground through a resistor 93. The emitter of transistor 90 is connected to a current mirror comprising transistors 91, 94 and 97 so that the collector current of transistor 91, which is dependent on the magnitude of the base input signal Vω to transistor 89, also flows through the resistor 95 connected to the collector of transistor 94 and which is connected to ground by capacitor 96. Resistor 95 and capacitor 96 correspond to resistor 84 and capacitor 82 in the circuit in FIG. 5. The circuit also comprises an electronic switch providing the function of the switch 83 in the circuit in FIG. 5. This electronic switch is constituted by a double diode 98, one cathode of which is connected to the output of a transducer for providing signals corresponding to reference times — for example, the upper dead center times of the pistons of the engine. The other cathode of the diode 98 is connected through diode 100 to the base of diode 99 which when conductive short-circuits and discharges condenser 96.

The junction of the collector of transistor 94 and of resistor 95 is connected to the base of grounded collector transistor 101, the emitter of which is connected to the base of a transistor 102 which forms part of a first comparator 103. This comparator, which corresponds to comparator 87 of the circuit in FIG. 5, also includes a transistor 104 whose base is connected to the output Vα of the curve synthesizer shown in FIG. 4, and whose emitter is connected to the emitter of transistor 102. The collectors of transistors 102 and 104 are connected, respectively, to the collectors of transistors 105 and 106, the bases of which are connected together, and the emitters of which are connected to the ground. The base and collector of transistor 105 are commoned. The junction point of resistor 95 and capacitor 96 is connected to the base of grounded collector transistor 107 the emitter of which is connected to the base of a transistor 108 which forms part of a second comparator 109.

The comparator 109, which corresponds to the comparator 88 of the circuit in FIG. 5, also includes a transistor 110 to the base of which is applied the output signal Vα of the curve synthesizer in FIG. 4, as well as two transistors 111 and 112. The circuit of comparator 109 is the same as that of comparator 103, it being noted that each comparator comprises a transistor differential amplifier including a current mirror circuit formed by transistors 105 and 106 in comparator 103 and by transistors 111 and 112 in comparator 109.

The output from comparator 103 is taken from the collector of transistor 106 and connected as a base input to npn transistor 115 while the output from the comparator 109, taken from the collector of grounded emitter npn transistor 112, is connected as a base input to npn transistor 114. An AND gate, including the transistors 114 and 115 has its output connected to a current amplifier stage 116. When the input (dependent on engine rotation speed) to transistors 102 and 108 equals the inputs (Vα) to transistors 104 and 110, and AND gate is enabled and the power stage 116 commences generation of an output control pulse to the ignition coil. When transistor 99 is switched on, in response to the reference time signal $t'$ to the diode 98, the AND gate is disabled and the output control pulse from the power stage 116 is terminated.

Referring again to FIG. 5, for each closure of switch 83, synchronized with an upper dead center reached by the respective engine pistons, the capacitor 82 is short-circuited and it discharges. When switch 83 opens, capacitor 82 is charged by a current, delivered by generator 85, which is proportional to the speed ω of rotation of the motor, and given by the expression:

$$I\omega = K\omega/R$$

in which K is a constant and R the equivalent resistor in series with current generator 85.

The voltage across the capacitor 82 is compared in comparator 88 with the negative output voltage Vα from the curve synthesizer 1 in FIG. 1, described in more detail with reference to FIG. 3.

This output voltage is given by the expression $$V = Vcc - V\alpha$$

α being the angle of advance computed by the curve synthesizer.

The voltage across the capacitor 82 reaches a value equal to that given by the curve synthesizer at the instant $$T = \frac{RC(Vcc - V\alpha)}{K\omega}$$

in which C is the capacity of capacitor 82.

Considering a four-stroke motor, T is also given by the expression $$T = \frac{\pi - \alpha}{\omega}$$

so that $$\frac{\pi - \alpha}{\omega} = \frac{RC(Vcc - V\alpha)}{K\omega}$$

and $$\pi - \alpha = \frac{RC}{K}(Vcc - V\alpha)$$

From the latter expression, it can be seen that the computed angle of advance, (α), is proportional to the voltage Vα and can be adjusted by the time constant RC.

For better energy utilization, a system embodying the invention preferably includes a circuit for charging the ignition coil at constant energy. To do this, the primary winding of the ignition coil should be fed a constant timed (fixed by the characteristics of the coil) before the discharge occurs in the coils. This effect is obtained by connection of resistor 84 in series with capacitor 82 and comparator 88. The voltage at the terminals of resistance 84, whose value is indicated by $r$, is given by the expression $$rI\omega = \frac{r}{R} \cdot K\omega$$

The ignition coil is fed for a time equal to γ −T, and $$\delta - T = \frac{RC}{K\omega}\left[(Vcc - V\alpha) - K\omega\frac{r}{R}\right] - \frac{RC}{K\omega}(Vcc - V\alpha)$$

i.e., γ −T = −rC.

which depends only on the values $r$ and C of the resistor 84 and capacitor 82.

Figure 6:
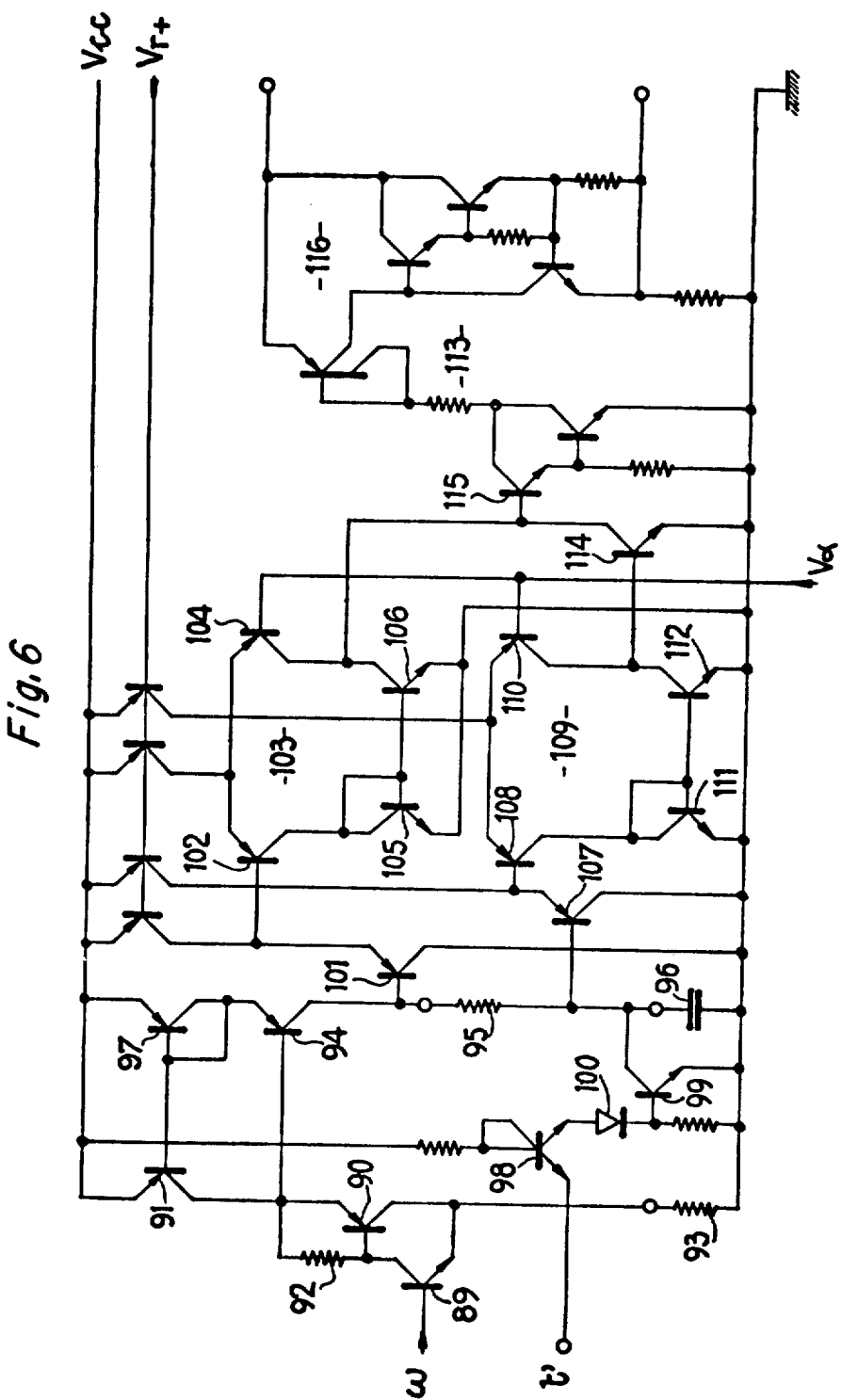
FIG. 6 is a more detailed electrical diagram of the shaping circuit in FIG. 5.

Operation of the circuit represented in FIG. 6 corresponds to that of the circuit in FIG. 5.

As already indicated above, the comparators 103 and 109 correspond, respectively, to comparators 87 and 88 of the circuit in FIG. 5. Likewise, capacitor 96 and resistors 95 and 93 correspond to capacitor 82 and resistors 84 and 86.

As a result of this arrangement, the ignition coil is fed only during the time required to provide it with sufficient energy to enable it to produce an appropriate high voltage at the terminals of the engine spark plugs, this feed being assured for a constant interval of time, but terminated at instants T that are variable as a function of the engine speed of rotation and the intake manifold pressure thereof.

The computer thus described is designed to control an ignition system for internal combustion engine, but it will be understood that such a computer can also be used to control a fuel injection system for an injection engine.

The curve synthesizer represented in FIG. 3 synthesizes curve segments as shown in FIG. 4 with positive slope, but it manifestly can also be readily designed to synthesize segments of negative slope when the model curve supplied by the engine manufacturer so necessitates.

A computer embodying the invention has the advantage that it can be constructed in the form of a monolithic integrated circuit, which gives it great reliability and very small size. The slope of each curve segment to be synthesized by the circuit of FIG. 2 is dependent upon the ratio $$\frac{R_{27}}{R_{30} + R_{31}}$$

while the extremities of a segment are a function of Ver, i.e., of $$\frac{R_{21}}{R_{22}}.$$

Consequently, since such resistor ratios may be accurately defined in an integrated circuit, close control of the operation of the overall synthesizer of FIG. 3 is readily obtainable.

The computer described above is designed to be used on a symmetric motor. In this case, the reference point can advantageously be the preceding upper dead center. However, in an asymmetric motor, the various upper dead centers are not spaced by the same angle and then a reference point which lies at a constant angle ahead of each upper dead center may be utilized.

What is claimed is:

1. An analog computer, suitable for providing control signals in an internal combustion engine, said computer comprising in combination:

a. signal synthesizer circuit means for generating a continuous ignition advance angle signal as a function of engine rotation speed over a predetermined speed range and of air intake pressure in accordance with a predetermined response characteristic, said synthesizer means comprising transconductance amplifier stages for generating signals corresponding with respective segments of said response characteristic and means for summing outputs from said amplifier stages to generate said continuous signal; and b. circuit means for controlling the instant of commencement of a control signal output from said computer with respect to a reference time, as a function of the instantaneous speed of engine rotation and of the instantaneous value of said ignition advance angle signal.

2. An analog computer according to claim 1, wherein said transconductance amplifier stages comprise: a series of first stages for synthesizing electric current signals corresponding with segments of a curve representing variations of ignition advance angle as a function of said engine speed of rotation within respective predetermined intervals of said engine speed range; and a second stage for generating an electric current signal corresponding with a curve representing variation of said ignition advance angle as a function of said air intake pressure; and said means for summing outputs from said first and second stages to generate said continuous ignition advance angle signal comprising electric current summation means.

3. An analog computer according to claim 2, further including means for generating, for each of said first stages, a reference voltage corresponding to the mid-point of the said curve segment to be synthesized by the output signal of said stage.

4. An analog computer according to claim 2, wherein said current summing means includes a current mirror circuit.

5. An analog computer according to claim 1, wherein said curcuit means controlling the instant of commencement of said control signal output comprises current generator means for generating a current proportional to the speed of engine rotation connected to a resistance-capacitance circuit for storing energy necessary for initiating commencement of said control signal output when the energy stored by said resistance-capacitance circuit produces a voltage across the capacitance of said resistance-capacitance circuit corresponding to said ignition advance angle signal.

6. An analog computer according to claim 5, wherein said circuit for controlling the instant of commencement of said control signal output includes switch means connected to short-circuit said capacitance at a predetermined instant in the operating cycle of said engine corresponding to said reference time.

7. An analog computer according to claim 1, further including circuit means for inhibiting said control signal output after a predetermined time interval.

8. In an internal combustion engine including an ignition system operated by control pulses and wherein the ignition angle is dependent upon the instantaneous speed of rotation of said engine and on the instantaneous air intake pressure of said engine, an analog computer circuit for generating said control pulses comprising, in combination:

a. signal synthesizer circuit means for generating a continuous ignition advance angle signal as a predetermined function of engine rotation speed over a predetermined engine speed range and of air intake pressure, said synthesizer circuit means comprising a plurality of first transistor transconductance amplifier stages for synthesizing output signals representing variations of ignition advance angel as a function of said engine speed of rotation over predetermined discrete intervals of said engine speed range; a second transistor transconductance amplifier stage for generating an output signal corresponding with variation of said ignition advance angle as a function of said air intake pressure; and a transistor summation circuit for summing said output signals from said first and second stages to generate said continuous ignition advance angle signal; and b. transistor circuit means for controlling the instant of commencement of a control pulse from said computer with respect to a reference time as a function of the instantaneous speed of engine rotation and of the instantaneous value of said ignition advance angle signal, said transistor circuit means comprising current generator means for generating a current proportional to the speed of engine rotation connected to a resistance-capacitance circuit for storing energy necessary for initiating commencement of a said control pulse when the energy stored by said resistance-capacitance circuit produces a voltage across the capacitance of said resistance-capacitance circuit corresponding to said instantaneous ignition advance angle signal.

9. An analog computer according to claim 8, further including means for generating for each of said first and second stages, respective reference voltages, each corresponding to the mid-point of a discrete interval of said engine speed range to be synthesized by the output signal of said stage.

10. An analog computer according to claim 8, wherein said means for summing outputs from said first and second stages includes a transistor current mirror circuit.

11. In an internal combustion engine including an ignition system operated by control pulses and wherein the ignition angle is dependent upon speed of rotation of said engine and air intake pressure of said engine, an analog computer circuit comprising in combination:

a. signal synthesizer circuit means for generating a continuous ignition advance angle signal as a predetermined function of engine rotation speed over a predetermined engine speed range and of air intake pressure, said synthesizer means comprising transconductance amplifier stages for generating output signals corresponding to respective segments of said engine speed range and means for summing said output signals from said amplifier stages to generate said continuous signal;

b. circuit means for controlling the instant of commencement of a control pulse from said computer with respect to a reference time as a function of the instantaneous speed of engine rotation and of the instantaneous value of said ignition advance angle signal, said circuit means comprising current generator means for generating a current proportional to the speed of engine rotation connected to a resistance-capacitance circuit for storing energy to generate a voltage for initiating commencement of a said control pulse when the energy stored by said resistance-capacitance circuit produces a voltage across the capacitance of said resistance-capacitance circuit corresponding to said ignition advance angle signal, and electrical switch means for short-circuiting said capacitance at a predetermined instant in each operating cycle of said engine corresponding to said reference time thereby inhibiting said control pulses such that said computer generates constant duration control pulses.

12. An analog computer according to claim 11, wherein said circuit means for controlling the commencement of a said control pulse comprises first and second comparator circuit means for receiving said ignition advance angle signal as a first input and a signal dependent on said current proportional to the speed of engine rotation as a second input, an AND gate having inputs connected to outputs of said first and second comparators such that said AND gate is enabled when said voltage across the capacitance of said resistance-capacitance circuit corresponds to said ignition advance signal thereby causing commencement of a said control pulse; and said electrical switch means connected to short-circuit said capacitance causes disablement of said AND gate and termination of that said control pulse at said predetermined instant in the operating cycle of said engine.

13. An analog computer as set forth in claim 12, including a resistor connected in series with said capacitor and wherein the duration of said control pulse is determined by the time constant of said series connected resistor and capacitor.

14. An analog computer as set forth in claim 12, wherein each of said comparators includes a transistor differential amplifier including a current mirror circuit.

15. An analog computer as set forth in claim 12, wherein said AND gate output is connected to control operation of an output current amplifier.

16. An analog computer as set forth in claim 11, wherein said signal synthesizer circuit means comprises a plurality of first transistor transconductance amplifier stages for synthesizing output signals representing variations of ignition advance angel as a function of said engine speed of rotation over said respective segments of said engine speed range; a second transistor transconductance amplifier stage for generating an output signal representing variation of said ignition advance angle as a function of said air intake pressure; and transistor means for summing output signal from said first and second stages to generate said continuous ignition advance angle signal.

17. An analog computer as set forth in claim 16, wherein said means for summing output signals from said first and second stages includes a transistor current mirror circuit.

* * * * *